United States Patent [19]

Ide

[11] 3,769,898

[45] Nov. 6, 1973

[54] DEVICE FOR AN AUTOMOBILE FOR SECURING VISIBILITY IN THE RAIN

[76] Inventor: Takashi Ide, Motoichiba-11-1, Fuji-shi, Shizuoka-ken, Ruji, Japan

[22] Filed: July 9, 1971

[21] Appl. No.: 161,169

[30] Foreign Application Priority Data
July 13, 1970 Japan.......................... 45/69152

[52] U.S. Cl. .................................................... 98/2
[51] Int. Cl. ............................................. B60h 1/24
[58] Field of Search....................... 98/2, 2.04, 2.09, 98/2.10, 2.12, 2.16, 2.17, 2.19, 92, 93, 94

[56] References Cited
UNITED STATES PATENTS
1,770,362 7/1930 Morgan............................... 98/2.10
1,868,142 7/1932 Hecton ................................ 98/2.10
1,871,722 8/1932 Morgan............................... 98/2.10
1,932,798 10/1933 Millard ............................... 98/2.10
2,258,922 10/1941 Alber.................................. 98/2.10

Primary Examiner—Meyer Perlin
Attorney—Kurt Kelman

[57] ABSTRACT

A device for an automobile for securing visibility, in which the rain drops coming in contact with the windshield of the automobile are scattered and removed by blasting across the windshield air drawn through the grill at the front end of the body of the automobile.

7 Claims, 4 Drawing Figures

PATENTED NOV 6 1973 3,769,898

INVENTOR.
TAKASHI IDE
BY Kurt Kelman
AGENT

DEVICE FOR AN AUTOMOBILE FOR SECURING VISIBILITY IN THE RAIN

This invention relates to a device for an automobile for securing visibility in the rain.

When an automobile is driven in the rain, either an electric windshield wiper using the automobile battery as a power source or a vacuum type wiper using air drawn from the engine.

Wiper blades are attached to either type of these systems for the outer surface of the windshield. However, since the wiper blades are made of rubber materials, they are worn by this wiping action and must be changed after being used for a certain period of time. Another disadvantage of wipers is that they effect the driver's eyes by their reciprocating motion. This effect may cause eye fatigue and may contribute to driving errors and accidents. Again, the friction between the wiper blades and the windshield increases in a light rain thereby generating an unpleasant scraping sound.

The main object of this invention is to eliminate the disadvantages of the conventional windshield wiper by providing a new device for securing visibility in the rain, in which air drawn in through the grill at the front end of the automobile body is jetted upward through jets along the bottom of the outer surface of the windshield to push upward the rain drops coming in contact with the outer surface of the windshield instead of using wiper blades to obtain such visibility.

Another object of this invention is to provide an entirely new type of device for securing visibility in the rain, in which an arched weir is installed on the upper part of the outer surface of the windshield to a width corresponding to the width for which visibility is desired. The stream of air coming out of the jets pushes the rain drops up to the top of the weir. The rain drops thus pushed up drain off along a path that does not interfere with the visibility by means of the weir. Thus, not only is a back flow of the rain drops into the field of visibility prevented but by means of the weir but also the rain drops are drained off via a path that does not interfere with the visibility so that the amount of rain water that must be pushed upward by the jet air can be reduced to the minimum.

Another object of the invention is to provide a device for securing visibility in the rain wherein air of uniform pressure is jetted out through the jet along the bottom of the other surface of the windshield to push the rain drops up and secure visibility, even when the automobile is not moving and also when the automobile is moving at a low speed immediately after starting or before stopping.

These and other objects of the invention will become apparent from the following specification and drawing which are merely exemplary of one embodiment of the present invention.

Figure 1:
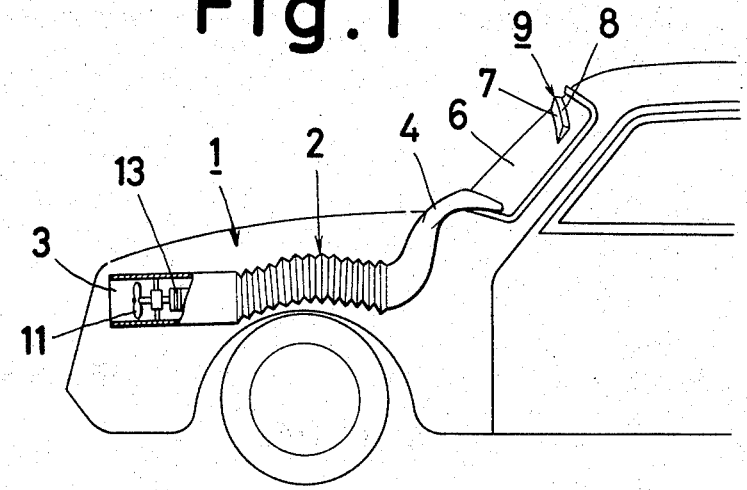
FIG. 1 is a schematic side view showing one embodiment of the device according to this invention.
Figure 2:
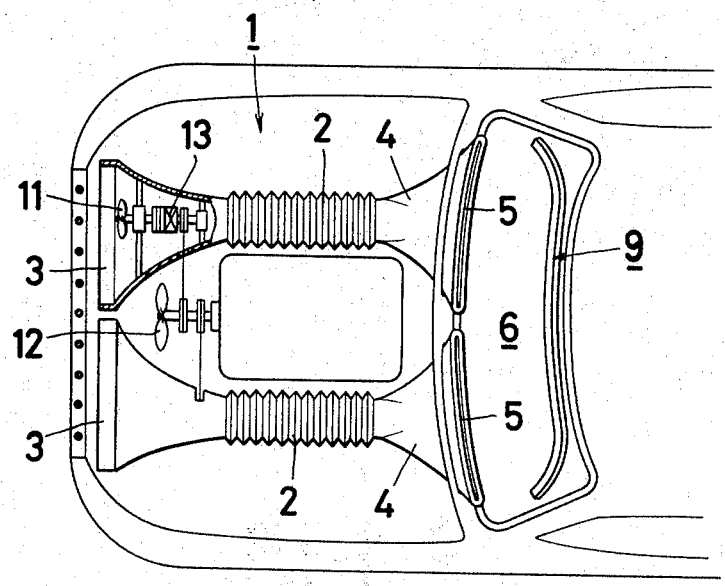
FIG. 2 is a schematic plan view of FIG. 1.

Referring to FIG. 1 and FIG. 2, ducts 2 may be installed inside the engine housing 1 of the automobile in the longitudinal direction of the automobile body. The front edge of the duct 2 forms an air intake for taking in air through the radiator grill of the housing room 1 while the automobile is moving. The portion of duct 2 between the air intake 3 and the jet 4 is preferably of flexible material so it can be bent to avoid other machinery and equipment inside the engine housing 1. The intake 3 of duct 2 must be arranged in such a way that it does not obstruct the function of taking in air for cooling the radiator. The rear part of the duct 2 has the fan-shaped part 4 spreading out in the direction of the width of the body of the automobile. The fan-shaped part 4 is fixed to slant upward toward the back. The jet 5 on the rear end thereof is turned upward toward the outer surface of the windshield 6. Thus the air taken in from the air intake 3 while the automobile is moving is compressed to raise its pressure and is blasted along the outer bottom surface thereof onto the windshield 6 to push up the rain drops coming in contact with the outer surface of the windshield to obtain the visibility. The shape of the jet 5 can be of any shape as long as it blasts the air taken in from the air intake over the entire surface of the windshield. A slit-type jet is most appropriate.

The length of jet 5 in the direction of the width of the automobile is fixed according to the width of visibility desired on the outer surface of the front windshield. If visibility is desired only over the part of the windshield right in front of the driver, the length of jet 5 can be comparatively shorter than when obtaining visibility over the entire surface of the front windshield.

In order to obtain visibility over the entire surface of the front windshield, jet 5 may be made long in the direction of the width of the automobile. It is also possible to install two ducts 1 and position their fan-shaped parts 4, 4 adjacent to each other in the direction of the width of the automobile, and thereby obtain visibility in front of the driver by means of the jet of one fan-shaped part, and visibility in front of the other seat by means of the jet of the other fan-shaped part. An arched weir is installed along the upper limit of visibility obtainable by the stream of air from nozzle 5, so that it stops the rain drops pushed upward by the stream of air from flowing downward and allows the water to flow down the outer surface of the front windshield along a path which does not interfere with the visibility.

Figure 3:
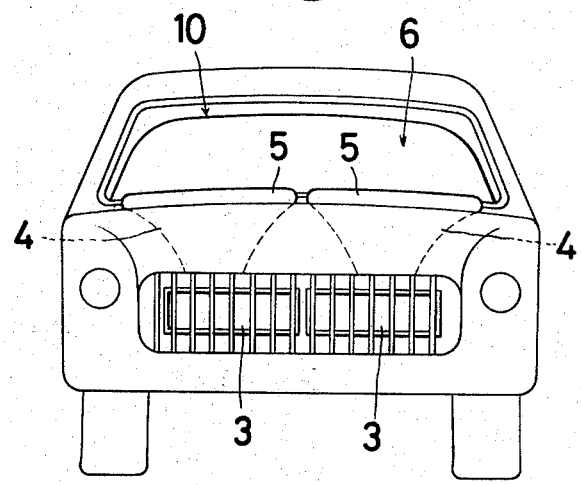
FIG. 3 is a front view showing another embodiment of a weir according to the present invention.
Figure 4:
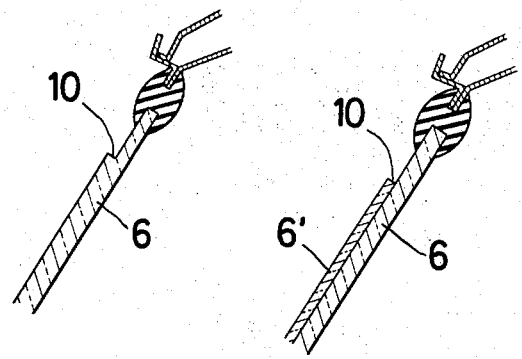
FIG. 4 shows two side views showing another embodiment of a weir according to the present invention.

The weir, in FIGS. 1 and 2, is made up of an arch 9 of wedge-shaped section having the slope 7 formed by installing the weir on the upper part of the outer surface of the windshield with the edge of the wedge pointing downward. The rain drops pushed upward by the stream of air pass over the wear to its head surface 8 which obstructs the back flow of rain drops which have crossed the slope 7. However, as shown in FIGS. 3 and 4, it is also possible to provide an arched step 10 which acts the same as the weir to allow the rain water to flow down along both sides of the surface of the windshield without allowing the rain drops pushed up by jet air to flow backward.

Step 10 can be made by processing the front windshield itself, or by bonding transparent plate 6' to the outer surface of the windshield. Furthermore, it is advisable that the arch 9 is also transparent.

Generally, the windshield of an automobile is slightly inclined toward the rear to reduce the air resistance while it is moving, and the air travels upward along the outer surface of the front windshield. In case the automobile is moving in the rain, rain drops touching the outer surface of the front windshield are pushed up toward the upper portion of the surface wiped by the wiper blade. This tendency is more conspicuous when an automobile is travelling at a high speed.

This invention takes advantage of the above-mentioned tendency and in addition allows air to be drawn into the duct from the air intake 2, raises the pressure of the air, and blasts the air from jet 5 from along the bottom of the outer surface of the windshield.

Naturally, the air flowing upward on the outer surface of the front windshield forcefully pushes up the rain drops touching the outer surface so as to secure visibility through the windshield. Moreover, the rain drops thus pushed up are guided by the arched weir installed on the outer surface of the windshield, and water thus collected flows down the outer surface of the front windshield along a path which does not interfere with the secured visibility. This weir, with its arched portion, drains off the rain drops coming in contact with the outer surface of the windshield above the weir along a path which does not obstruct visibility. This is useful for reducing the amount of rain water which must be pushed upward by the stream of air.

Even when the automobile is not moving or when it is travelling at a low speed, fan 11 installed in the duct 1 is made to rotate by conveying the rotation of radiator fan 12 of the engine to blast the air through jet 5. Fan 11 can, of course, be made to rotate by separately installing an electric motor without relying on the rotation of the engine, but this is not recommendable since such an electric motor would consume electricity necessary to the automobile.

The fan 11 can be made to rotate constantly inside the duct 1 as long as the automobile engine is running. Again, by including an electromagnetic clutch 13 in the system which conveys rotation to fan 11, it is possible to stop the rotation of fan 11 by electromagnetically maintaining the clutch at "OFF" when the speed of the automobile has reached a certain level, and it is also possible to operate the fan 11 again by stopping the supply of electricity to the electromagnetic clutch and returning the clutch to "OFF" when the speed of the automobile has dropped to below said level. The "ON" and "OFF" mechanism of the clutch can be connected with the gear changing mechanism so that it will go "ON" when the transmission is shifted into neutral or low, and to "OFF" when shifted to second and above.

The above explanation refers to an automobile having a front engine. In case of a rear engine automobile, a duct is installed at a suitable place in the lower part of the trunk compartment so that the same is achieved as in the case of a front engine automobile.

As explained above, the device based on this invention perfectly scatters the rain drops coming in contact with the front windshield without using reciprocating wiper blades while the automobile is running or moving slowly. This enables the driver to drive the automobile safely in the rain.

Although the summary of the new and improved device has been described to fully disclose one embodiment of the invention, it should be understood that the foregoing is merely illustrative and not limitative and that various changes or modifications may be made without departing from the principles given in the claim.

What is claimed is:

1. In combination with an automobile windshield, a device for securing visibility in rain, said device comprising, an air duct having an air intake and a fan shaped rear end portion, said fan-shaped rear end portion disposed for blasting air on the lower outer surface of the windshield, and a weir disposed near the upper outer surface of the windshield separate of the windshield support, said weir disposed to receive rain pushed upward on the windshield by a stream of blasting air from the said fan-shaped rear end portion of the air duct and to cause received rain to flow down a part of the outer windshield which is outside a field of desired visibility.

2. The device of claim 1 wherein a fan is disposed within the air duct.

3. The device of claim 2 wherein the fan is driven by a magnetic clutch.

4. The device of claim 2 wherein the fan is driven by the automobile engine.

5. The device of claim 1 wherein the air intake is disposed near the front portion of the automobile, with the air duct being disposed within the engine housing area.

6. The device of claim 5 wherein two air intakes are so disposed.

7. The device of claim 1 wherein the weir is a wedge shaped member disposed as an arch along the upper outer portion of the windshield.

* * * * *